W. Hall,

Lock.

No. 212. Reissued Mar. 30, 1852.

AM. PHOTO-LITHO. CO. N.Y. (OSBORNE'S PROCESS.)

UNITED STATES PATENT OFFICE.

WILLIAM HALL, OF BOSTON, MASSACHUSETTS.

POWDER-PROOF LOCK.

Specification forming part of Letters Patent No. 5,686, dated August 1, 1848; Reissue No. 212, dated March 30, 1852.

*To all whom it may concern:*

Be it known that I, WILLIAM HALL, of Boston, in the county of Suffolk and State of Massachusetts, have invented a new and useful Improvement in Locks for Doors of Vaults, Safes, &c., the object of the said invention being not only to render said lock incapable of being picked, but to prevent the introduction into it of gun-powder, gun-cotton, or other chemical explosive material, the explosion of which would shatter, break, or injure it; and I do hereby declare that the same is fully described and represented in the following specification and accompanying drawings, letters, figures, and references thereof.

Figure 3:
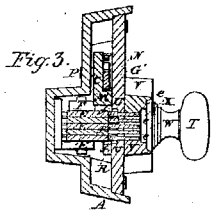
Figure 2:
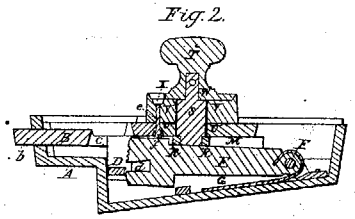
Figure 5:
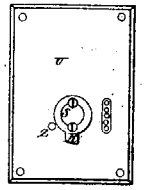
Figure 4:
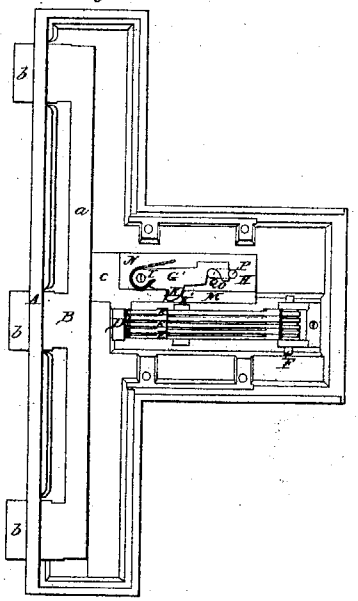
Figure 1:
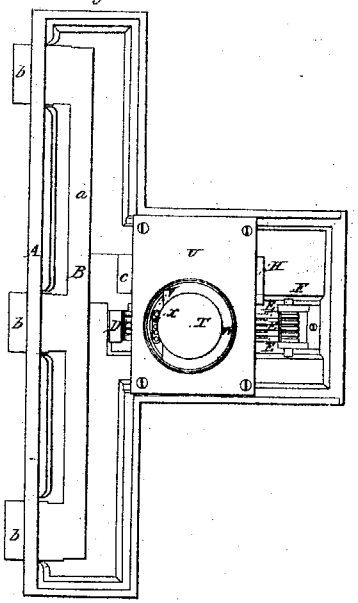

Of the said drawings, Figure 1 denotes an elevation of the said lock, portions of the cover or top plate being exhibited as removed from the case in order to more clearly represent some of the operative parts. Fig. 2 is a transverse section of the lock taken through the handle and bolt. Fig. 3 is a vertical cross-section taken through the key-recess. Fig. 4 is a view of the lock as it would appear if the handle and its supporting-plate were removed from over the tumblers and main bolt. Fig. 5 is a view of the lower side of the supporting-plate and the cam, through the aid of which the dog of the bolt is raised and the main bolt moved forward and backward, as occasion may require.

In said figures, or in such of them as it is seen, A represents the metallic case of the lock.

B is the main bolt, which in this instance is composed of a straight bar, *a*, three studs, *b b b*, extending from and at right angles to one side of it, and an elongated bar, *c*, projecting from its opposite side, all as seen in Fig. 4. The said main bolt has also a stud, D, projected from it, and arranged so as to operate in connection with a system of five or any other suitable number of tumblers or slotted levers, E E, &c. Each of said levers or tumblers turns on a fulcrum or pin, F, and is forced upward by a spring, G, properly applied to it. Each lever or tumbler has a long slot or opening, *d*, made in its front end and adjacent to the stud D, and of a width or size sufficient to receive the stud when the main bolt is thrown back. The several slots, *d*, of the tumblers are arranged in their respective tumblers or in relation to one another, as it is customary to dispose them in various other locks where such tumblers are used in connection with the main bolt. The main bolt has a dog lever or tumbler, G′, applied to it and made to work in a recess or depression, H, of the bolt. The said dog turns on a fulcrum or pin, I, and has a stud, K, projecting from it and through an opening, K′, made through the part M of the bolt. A spring, N, is applied to the dog and bolt in such a manner as to so operate on the dog as to press it toward the part M. There is a recess, O, made in the said dog, as seen in Fig. 4. The said recess is intended to act in connection with a pin, P, made to project upward from the case of the lock and through a long slot, Q, made through the main bolt, as represented in Fig. 4 by dotted lines. When the bolt is thrown forward, the dog G′ takes the position denoted in Fig. 4—that is to say, its rear end comes directly in front of the pin P, so as to prevent the bolt from being receded or moved back until the dog is elevated above the pin, so when the bolt is thrown back the recess O receives the pin P and prevents the bolt from being moved forward until the dog is raised so as to carry the said recess above the pin. The elevation of the dog is effected by a cam, R, (see Fig. 5,) which is made to project from the shank S of the handle T and move against the lower side of the supporting hardened-steel plate V. On turning the handle the said cam may be caused to enter the recess K′ and elevate the dog G′ above the pin P, and press against one of the sides of the recess and throw the bolt either backward or forward, according to the direction in which said handle is turned.

The afore-described parts, with the exception of the handle and its shank and cam, may be said to be similar to such as are in common use in various other locks, the only material difference, if any, in them being in their arrangement or disposition with respect to one another, the same being such as renders them adaptable to my improvement, which I shall now proceed to specify.

Affixed to the plate U is a hardened-steel cylinder, V, which is of sufficient length to pass entirely or nearly through the door to which the lock is to be attached. The outer end or part of said cylinder is formed with a circular depression of sufficient size to receive a hardened steel plate, W, which is circular, with the exception of a small segment taken from one side of it, as seen in the drawings. The said plate is attached to the shank of the handle or to the handle itself, and moves with said handle and shank.

The cylindrical projection V has an elongated recess, X, made in it, as seen in Figs. 1, 2, and 3. From the bottom of the said recess and through the cylinder and its supporting-plate, and directly over the system of tumblers or levers E, E, &c., holes are bored of proper size to receive small pins, wires, or rods *e e e* &c., there being the same number of said holes as there are tumblers, or, in other words, there being one hole and one pin to each of the tumblers. Each pin rests upon one of the tumblers. The several pins should be so adapted to their respective holes as to slide freely up and down in or through the same. Each pin has a head, *f*, which prevents it from being drawn through and out of the hole in a direction outwardly.

The several pins, the thickness of the cylinder and that of its sustaining-plate, and the extent of movement of the several tumblers should be so regulated that any one pin, when pressed downward in its hole until the tumblers of it reaches its lowest point of depression, shall not pass entirely out of the hole it moves in, the hole being made to steady the pin and always keep it in place. This will prevent the introduction of any instrument or any powder or explosive chemical material into the lock by passing the same through any one or more of the said holes.

Figure 6:
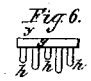
Figure 7:
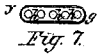

The recess X, I term the "key-recess," its object being to receive the bar or part *g* of the key Y, a side view of said key being represented in Fig. 6 and a bottom view in Fig. 7. The said key is composed of the bar *g* and several small pins, *h h*, &c., of different lengths extended from the same and at right angles to it, as seen in Fig. 6. Each pin *h* belongs to one of the pins *e e*, &c., before described, and it should be of a length sufficient, when the key is placed in the key-recess and forced down, so as to depress the rods *e e*, &c., and their tumblers to depress its pin, and consequently the tumbler thereof, to the depth required to enable the stud D of the bolt to pass into the slot *d* of the tumbler.

When the key Y is pressed into the key-recess, the handle may be turned so as to cause the plate W to pass over and cover the key and keep it in place, while the handle is farther turned sufficiently to produce a recession of the bolt.

The plate W, as applied to the handle and made to revolve with it, may be considered as auxiliary to my main improvement or invention, as a lock may be constructed without such a plate, the handle, its shank, and cam being used to move the bolt, while the tumblers may be kept down by the key held in place by any other suitable means. I, however, consider the said plate W as a very important addition, as it will be seen that when said plate is used in the manner hereinabove described it is impossible to throw the bolt back until the key and its recess have been completely covered by said plate. Consequently, the difficulty of succeeding in any attempt to pick the lock by using any means other than the key itself, or an exact counterpart of it, will be obvious.

If the whole base of the lock has a covering-plate of hardened steel, any attempt to bore or drill through the said cover in order to introduce gunpowder or any explosive material will be frustrated. A lock provided with such a plate and contrivances as above specified, it is believed, would effectually resist any attempt to insert in it an explosive material in order to blow it to pieces or destroy it.

Z, Fig. 5, is a pin or stud projecting from the plate U. The cam strikes against said stud in order to limit the movements of the handle and its plate W.

What I claim as my invention is—

1. The combination of the handle-shank and cam, one or more pins, *e e*, &c., and their sustaining holes or apertures, in their application to the bolt and one or more tumblers, and as operated substantially as specified, meaning to claim said combination as composed of the afore-described elements and their accessories.

2. To combine with or in combination with the bolt and tumblers a contrivance for throwing or moving the bolt back and forth, another or a key separate and distinct from such contrivance, and for the purpose of moving the tumblers into correct positions for the bolt to be moved, and which shall be perfectly stationary after it has so mooved the tumblers, and a movable plate, or its equivalent, applied to the contrivance by which the bolt is actuated and made to entirely cover the key and prevent access to it when the bolt is put in motion, not meaning by the above to claim the separate combination of either of the above-mentioned three parts with the bolt and tumblers, but intending to limit my claim to the combination of all of them therewith, so as to operate in conjunction with them, essentially as specified.

WM. HALL.

Witnesses:
R. H. EDDY
GEO. W. PHIPPS.